US012752577B2

(12) United States Patent
Son et al.

(10) Patent No.: US 12,752,577 B2
(45) Date of Patent: Oct. 6, 2026

(54) COMPENSATING FOOTPRINT LENGTH FOR INFLATION PRESSURE CHANGES

(71) Applicant: The Goodyear Tire & Rubber Company, Akron, OH (US)

(72) Inventors: Roman Son, Colmar-Berg (LU); Kanwar Bharat Singh, Akron, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 32 days.

(21) Appl. No.: 18/883,225

(22) Filed: Sep. 12, 2024

(65) Prior Publication Data

US 2025/0153518 A1 May 15, 2025

Related U.S. Application Data

(60) Provisional application No. 63/598,217, filed on Nov. 13, 2023.

(51) Int. Cl.
*B60C 23/00* (2006.01)
*B60C 23/04* (2006.01)

(52) U.S. Cl.
CPC ............ *B60C 23/001* (2013.01); *B60C 23/04* (2013.01)

(58) Field of Classification Search
None
See application file for complete search history.

(56) References Cited

U.S. PATENT DOCUMENTS 3,661,014 A 5/1972 Ciampolini
4,724,703 A 2/1988 Neugebauer et al.
6,278,361 B1 8/2001 Magiawala et al.
6,321,180 B1 11/2001 Hubbell, Jr.
6,539,295 B1 3/2003 Katzen et al.
6,959,593 B2 11/2005 Mancosu et al.
7,000,462 B2 2/2006 Hillenmayer et al.
7,013,721 B2 * 3/2006 Keller .................. B60C 23/061 73/146

(Continued)

FOREIGN PATENT DOCUMENTS

CN 103832223 A * 6/2014 ............. B60C 23/02
CN 106796163 A * 5/2017 ....... G08G 1/096716

(Continued)

OTHER PUBLICATIONS

Search Report for European application No. 24211329 dated Mar. 20, 2025.

*Primary Examiner* — Justin S Lee
(74) *Attorney, Agent, or Firm* — Edward T. Kennedy

(57) ABSTRACT

Disclosed are various embodiments for compensating footprint length for inflation pressure changes in tires. Various embodiment can receive a tire pressure measurement for a tire and an uncompensated footprint length for the tire. Various embodiments can calculate an inflation difference between the tire pressure measurement and a target tire pressure for the tire. Then, various embodiments can calculate an inflation ratio by at least on finding a quotient of the inflation difference over the target tire pressure for the tire. Based at least on the inflation ratio, various embodiments can determine a compensated footprint length. Then, various embodiments can send the compensated footprint length to a vehicle system.

15 Claims, 3 Drawing Sheets

(56) References Cited

U.S. PATENT DOCUMENTS 7,404,317 B2 7/2008 Mancosu et al.
7,536,903 B2 5/2009 Schillinger et al.
7,546,764 B2 6/2009 Morinaga
7,552,628 B2 6/2009 Mancosu
8,255,114 B2 8/2012 Fink et al.
8,661,885 B1 3/2014 Singh et al.
8,742,911 B2 6/2014 Wagner et al.
8,844,346 B1 9/2014 Singh et al.
8,874,386 B2 10/2014 Brusarosco et al.
9,120,356 B2 9/2015 Patel et al.
9,157,785 B2 10/2015 Brenninger
9,222,854 B2 12/2015 Singh et al.
9,310,242 B2 4/2016 Kammann et al.
9,358,846 B2 6/2016 Singh et al.
9,874,496 B2 1/2018 Singh
10,245,906 B2 4/2019 Singh et al.
11,298,991 B2 4/2022 Singh et al.
2003/0058118 A1 3/2003 Wilson
2003/0079536 A1* 5/2003 Fischer ............... B60C 23/0401 73/146
2003/0149515 A1 8/2003 Hessmert et al.
2005/0072223 A1 4/2005 Fennel et al.
2005/0085987 A1 4/2005 Yokota et al.
2005/0150283 A1 7/2005 Shick
2007/0240501 A1 10/2007 Mancosu et al.
2008/0103659 A1 5/2008 Mancosu et al.
2009/0055040 A1 2/2009 Nagaya
2011/0060500 A1 3/2011 Irth et al.
2011/0199201 A1 8/2011 Brusarosco et al.
2012/0029759 A1 2/2012 Suh et al.
2013/0211621 A1 8/2013 Breuer et al.
2013/0261991 A1 10/2013 Tebano et al.
2013/0278406 A1 10/2013 Weston
2014/0005956 A1 1/2014 Patel et al.
2014/0008132 A1* 1/2014 Kamamann ........... B60T 8/1725 177/136
2014/0069181 A1 3/2014 Singh et al.
2014/0257629 A1 9/2014 Singh et al.
2014/0260585 A1 9/2014 Singh
2014/0278040 A1 9/2014 Singh et al.
2015/0217607 A1 8/2015 Singh
2015/0247780 A1 9/2015 Kretschmann et al.
2016/0129737 A1 5/2016 Singh et al.
2016/0153827 A1 6/2016 Ham et al.
2017/0355234 A1 12/2017 Dharamshi et al.
2019/0025113 A1 1/2019 Masago
2020/0164703 A1* 5/2020 Singh .................... B60W 40/13

FOREIGN PATENT DOCUMENTS

CN 115284796 A * 11/2022 ............. B60C 23/00
DE 10333282 A1 * 2/2005 ......... B60C 11/0318
EP 1607244 B1 * 2/2007 ....... B60C 23/00318
EP 2138372 A1 8/2012
EP 2679411 A2 1/2014
EP 2777956 A2 9/2014
EP 2778631 A2 9/2014
EP 3359399 B1 12/2019
JP 2007153034 A 6/2007
JP 2011053027 A 3/2011
WO 2008075126 A1 6/2008
WO 2011054363 A1 5/2011
WO WO-2015014635 A1 * 2/2015 ........... B60C 23/061
WO 2016066254 A1 5/2016
WO WO-2020007890 A1 * 1/2020 ......... B60C 23/0481

* cited by examiner

COMPENSATING FOOTPRINT LENGTH FOR INFLATION PRESSURE CHANGES

BACKGROUND

A footprint length of a tire refers to the length of the portion that makes contact with the road. The footprint length can be a good indicator of numerous features of a tire, such as traction, handling, wear, fuel efficiency, comfort, performance, and load-bearing capacity. The footprint length can vary based on various factors of the tire, such as the vehicle load, pressure, temperature, and wear state of the tire. Optimizing the footprint length can impact areas such as vehicle safety, fuel efficiency, and environmental sustainability.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
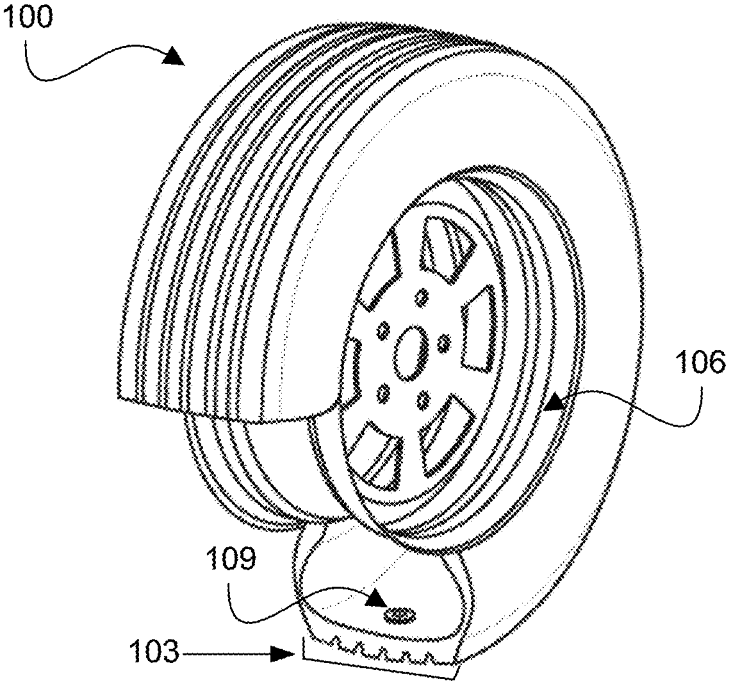
FIG. 1A a pictorial diagram of a tire in a forward perspective view showing a portion bisected to demonstrate a sensor within the tire according to various embodiments of the present disclosure.

Disclosed are various approaches for compensating footprint length for inflation pressure changes in tires. Footprint length refers to the length of the portion of the tire that makes contact with the road surface, known as a contact patch. The footprint length measurement can be significant to a tire due to the correlation with contact patch and traction, handling, wear and tire life, fuel efficiency, comfort, performance, and load-bearing capacity. However, the footprint length can vary based on various factors of the tire, such as the vehicle load, inflation pressure of the tire, temperature, and/or other tire factors. In some situations, an increase in inflation pressure decreases the footprint length. Reciprocally, a decrease in inflation pressure increases the footprint length. Further, in some situations, an increase on the load or weight also increases the footprint length. Reciprocally, a decrease on the load or weight also decreases the footprint length. When these factors change within a tire that is configured to an optimal footprint length, the result is that the tire will be operating under a sub-optimal footprint length. To resolve that, the tire may have to compensate to achieve the desired footprint length that is optimal or other vehicle systems may need to account for the sub-optimal footprint length.

Various methods have been used to calculate the compensated footprint length. However, many methods of calculating a compensated footprint length have previously required knowledge about the load state of the vehicle or at least an estimation for the load of a vehicle because the pressure sensitivity of the footprint length changes with load. For example, previous models could first calculate the load state indicator of a vehicle using the footprint length. That load indicator could then be used in a classification model with the inflation pressure to predict the load state of a vehicle. When the pressure sensitivity for each load state stays relatively constant, we can calculate the compensated footprint length. The compensated footprint length can subsequently be used to calculate various other information, like a detailed calculation of load of the vehicle. However, because the calculation to obtain the compensated footprint length relies on an estimated load, the detailed calculation of the load that relies on the compensated footprint length would also rely on the estimated load of the vehicle. This creates a circular dependency between the footprint length and the load of the vehicle. This circular dependency could often make calculations error prone or inefficient to calculate with precision. Additionally, the calculations to estimate load often required additional calculations and additional data storage that can be challenging for vehicles or other connected systems to accommodate. Accordingly, a need existed to find a way to simplify the calculation and remove the dependency on the load of a vehicle.

Various embodiments of this disclosure are directed to calculating a compensated footprint length without utilizing additional load calculations. Various embodiments of this disclosure can estimate a compensated footprint length with similar precision as load-dependent formulas, without any such dependency on the load of the vehicle. Moreover, the present embodiments require fewer computations and less data storage, as loading state classification models are not necessary. The present embodiments instead take into consideration a non-linear relationship between the footprint length and the inflation pressure to accurately calculate the compensated footprint length. By doing this, the footprint lengths are normalized, which allows for the comparison of different footprint length datasets that are collected at different tire inflation pressure conditions to depict values that relate to a common scale.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

As illustrated in FIG. 1A, shown is an example of a tire 100 as referenced in various embodiments of this disclosure. The tire 100 can incorporate a multi-layered construction from various materials. Each tire 100 includes a pair of sidewalls that extend to a circumferential tread 103, which engages the ground during vehicle operation. When mounted to a wheel 106, a tire 100 can be configured to maintain gasses within an inner cavity between inner walls lateral to the sidewalls, an inner liner laterally attached to the circumferential tread 103, and an inner cavern of the wheel 106. The inner cavity can maintain a varying amount of pressure based at least on the various configurations of the tire, such as tire size (e.g., depth, radius, circumference, etc.), tire materials, and environmental conditions (e.g., environmental temperature, etc.).

The tire 100 can include a sensor 109. The sensor 109 can be affixed to at least one of the inner liner laterally attached the circumferential tread 103 (as shown in FIG. 1A), the inner walls of the tire 100, or the inner portion of the wheel 106. In some embodiments, the sensor 109 can be affixed using an adhesive. In some embodiments, the sensor 109 can be affixed by being embedded within the structure that the sensor 109 is affixed (e.g., the walls of the tire, the wheel 106, etc.).

The sensor 109 can be used to measure a footprint length, an inflation pressure, and a temperature, as well as various other measurements. The sensor 109 can measure footprint length using metric units (e.g., millimeters, centimeters, etc.) or imperial units (e.g., inches, feet, etc.). The sensor 109 can measure inflation pressure in various unit types, such as pounds per square inch (PSI), pascals (Pa) or kilopascals (kPa), bars, atmospheres (ATM), and kilograms per square centimeter ($kg/cm^2$). The sensor 109 can measure temperature in various unit scales, such as Celsius, Fahrenheit, Kelvin, or other temperature scales. In various embodiments, the sensor 109 can be a tire pressure monitoring system (TPMS) sensor.

Figure 1B:
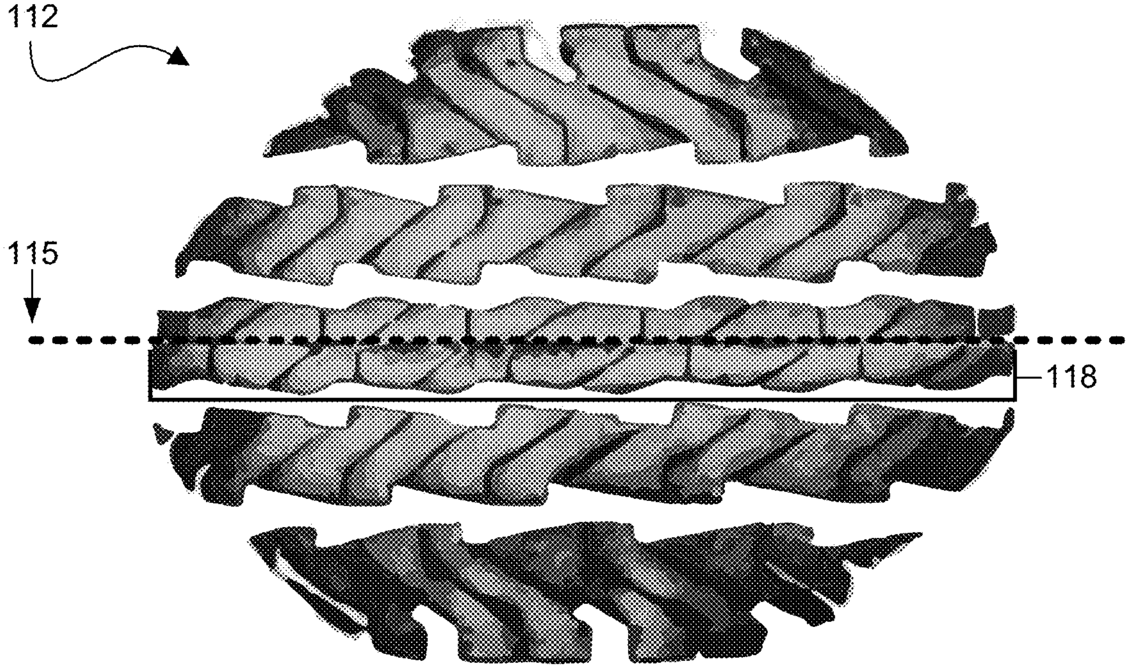
FIG. 1B a pictorial diagram of a tire footprint made by a tire according to various embodiments of the present disclosure.

In FIG. 1B, depicted is an example footprint 112 made by a tire 100. The footprint shows the imprint or impression made by the treads 103 of the tire 100 as it is making contact with a surface. The footprint 112 can be used to demonstrate various ways to measure a footprint length of the tire 100. For example, at least one way to measure a footprint length is along the center line 115 (as depicted as a dashed line horizontally shown in FIG. 1B) of the footprint 112. Length 118 depicts the portion of the footprint 112 that would be measured using any standard means of measurement.

The footprint length can be affected based on various factors. For instance, the size or design, inflation pressure, the weight distribution of a vehicle, load of a vehicle, road conditions, and/or various other factors. Specifically, an increase in inflation pressure decreases the footprint length. Reciprocally, a decrease in inflation pressure increases the footprint length. Additionally, an increase on the load or weight on the tire 100 also increases the footprint length. Reciprocally, a decrease on the load or weight on the tire 100 also decreases the footprint length. Additionally, various road conditions like off-road environment conditions can modify the footprint length as it relates to the environment.

Figure 2:
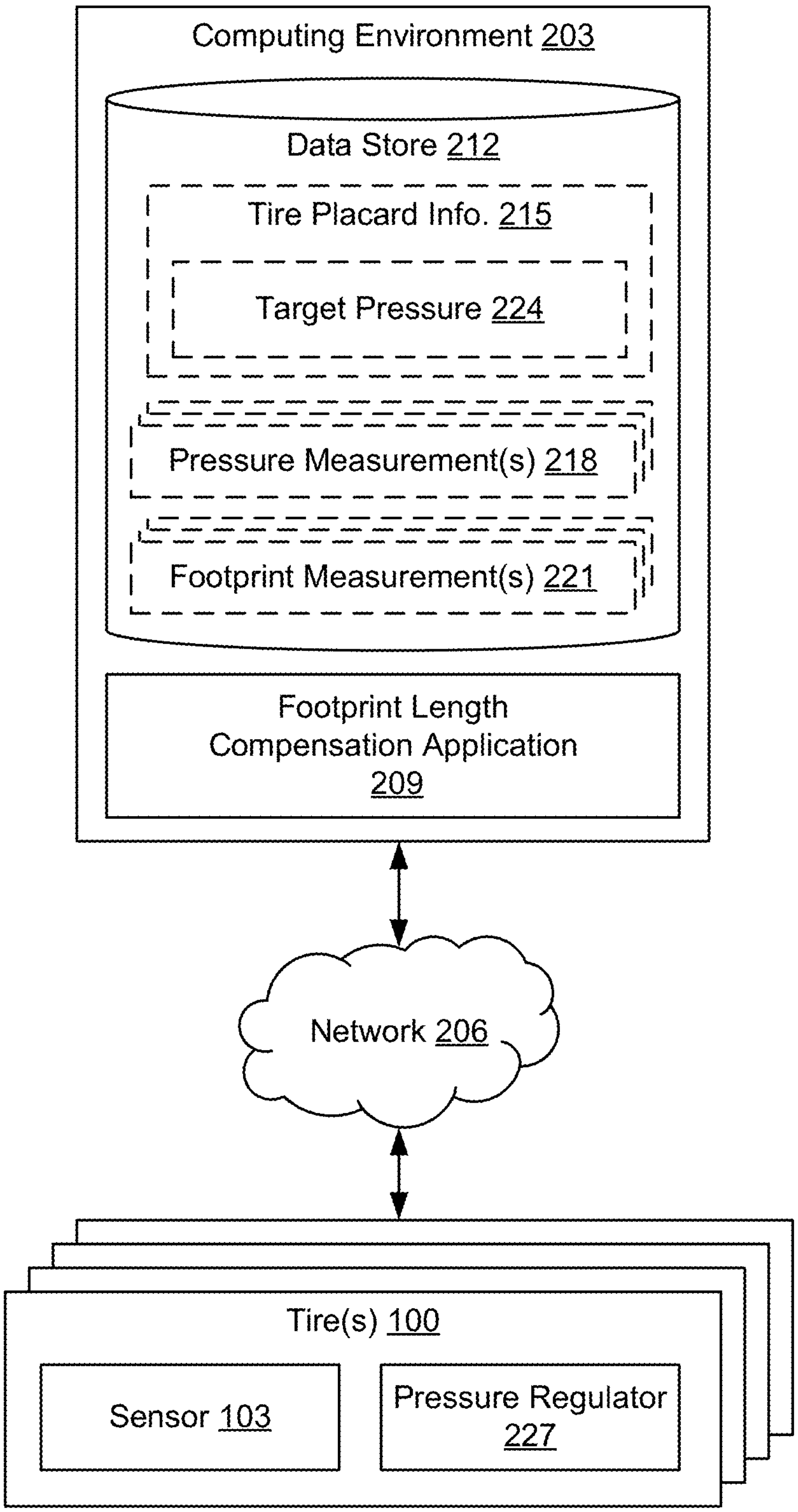
FIG. 2 is a drawing of a network environment according to various embodiments of the present disclosure.

With reference to FIG. 2, shown is a network environment 200 according to various embodiments. The network environment 200 can include a computing environment 203, one or more tires 100, which can be in data communication with each other via a network 206.

The network 206 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 can also include a combination of two or more networks 206. Examples of networks 206 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. As another example, such computing devices can be a central computing device installed within a vehicle. Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include a footprint length compensation application 209, and other applications, services, processes, systems, engines, or functionality not discussed in detail herein.

The footprint length compensation application 209 can be executed to perform various actions. In various embodiments, the footprint length compensation application 209 can receive a tire pressure measurement from a sensor 103 for a tire 100. The tire pressure measurement can be stored as a pressure measurement 218 in the datastore 212. The footprint length compensation application 209 can also receive uncompensated footprint length from the sensor 103. The uncompensated footprint length can be stored as a footprint measurement 221 in the datastore 212. In at least one embodiment, the footprint length compensation application 209 can calculate a compensated footprint length using the following formula:

$$FPL_{compensated} = FPL_{uncompensated} * \left(1 + SensorMod * \frac{(\text{Inflation}_{measured} - \text{Inflation}_{target})}{\text{Inflation}_{target}}\right)$$

The formula is directed to finding the "$\text{FPL}_{compensated}$", which is a compensated footprint length. The "$\text{FPL}_{uncompensated}$" variable can be the uncompensated footprint length received from the sensor 103. The "$\text{Inflation}_{measured}$" variable can be the tire pressure measurement received from the sensor 103. The "$\text{Inflation}_{target}$" variable can be a tire pressure that is identified in the tire placard information 215, such as the target pressure 224. The "SensorMod" variable can be a modifier that compensates for the results received from the sensor 103, to ensure that a specific brand of sensor 103 that is more sensitive does not provide a substantially different result from a different brand of sensor 103 that may be less sensitive. In various embodiments, the value of the "SensorMod" variable can be between "0.5" and "1".

The formula can be described in at least the following way: the footprint length compensation application 209 can calculate an inflation difference between the tire pressure measurement received from the sensor 103 and a target pressure 224 for the tire 100. The footprint length compensation application 209 can calculate an inflation ratio by at least on finding a quotient of the inflation difference over the target pressure 224 for the tire 100. The footprint length compensation application 209 can then determine the compensated footprint length based at least in part on the inflation ratio and the inflation difference. In at least some embodiments, the footprint length compensation application 209 can cause the tire 100 to adjust the tire pressure to achieve the compensated footprint length. In some embodiments, the footprint length compensation application 209 can send the compensated footprint length to other systems within a vehicle for further calculations. Further discussion about the functionality of the footprint length compensation application 209 is described in the discussion of FIG. 3.

Also, various data is stored in a data store 212 that is accessible to the computing environment 203. The data store 212 can be representative of a plurality of data stores 212, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 212 is associated with the operation of the various applications or functional entities described below. This data can include tire placard information 215, pressure measurements 218, and footprint measurements 221, and potentially other data.

The tire placard information 215 can represent information that is relevant to a specified tire 100. For instance, the tire placard information 215 can include the tire size, which is often represented as tire width, aspect ratio, and diameter (e.g., "P215/60R16", etc.). In another example, the tire placard information 215 can include load capacity, spare tire information, tire type, speed rating, and various other information. In various embodiments, the tire placard information 215 can include one or more recommended tire pressures, such as a target pressure 224, a maximum tire pressure, and a minimum tire pressure. A target pressure 224 can represent a tire inflation pressure that is optimal for the tire in standard conditions. The target pressure 224 can be measured in various unit types, such as pounds per square inch (PSI), pascals (Pa) or kilopascals (kPa), bars, atmospheres (ATM), and kilograms per square centimeter ($kg/cm^2$).

The pressure measurements 218 can represent inflation pressure of a tire 100 received from a sensor 103 of the tire 100 over a period of time. The pressure measurements 218 can be measured in various unit types, such as pounds per square inch (PSI), pascals (Pa) or kilopascals (kPa), bars, atmospheres (ATM), and kilograms per square centimeter ($kg/cm^2$). The pressure measurements 218 can be stored by the footprint length compensation application 209 when its received from a sensor 103 of a tire 100. Each pressure measurement 218 can be stored in correlation to a time which the pressure measurement 218 was taken and the tire 100 for which the pressure measurement 218 corresponds.

The footprint measurements 221 can represent the footprint length of a tire 100 received from a sensor 103 over a period of time. The footprint measurements 221 can be measured in various unit types, like metric units (e.g., millimeters, centimeters, etc.) or imperial units (e.g., inches, feet, etc.). In at least some embodiments, the footprint measurements 221 can be measured along the center line 115 of a footprint 112 made from a tire 100. The footprint measurements 221 can be stored by the footprint length compensation application 209 when it's received from a sensor 103 of a tire 100. Each footprint measurement 221 can be stored in correlation to a time which the footprint measurement 221 was taken. Each footprint measurement 221 can also be stored in correlation to the tire 100 for which the footprint measurement 221 corresponds.

The tires 100 can include various devices, such as sensor 103 and pressure regulator 227. The tires 100 and the sensor 103 are described in the discussion of FIG. 1A. A pressure regulator 227 can be a device that can regulate the pressure within a tire 100. For instance, the pressure regulator 227 can cause the tire 100 to increase inflation pressure or decrease the inflation pressure within the tire 100. In some embodiments, the pressure regulator 227 can be an air compressor that is continuously connected to the tire. In some embodiments, the pressure regulator 227 can receive instructions over the network 206 to increase or decrease the inflation pressure of the tire 100. In some embodiments, the instructions received over the network 206 can indicate increasing the inflation pressure to a specified pressure amount. In some embodiments, the pressure regulator 227 can request and receive an inflation pressure measurement from the sensor 103. The inflation pressure measurement received from the sensor 103 can be used to determine when the inflation pressure within the tire 100 has been reached.

Figure 3:
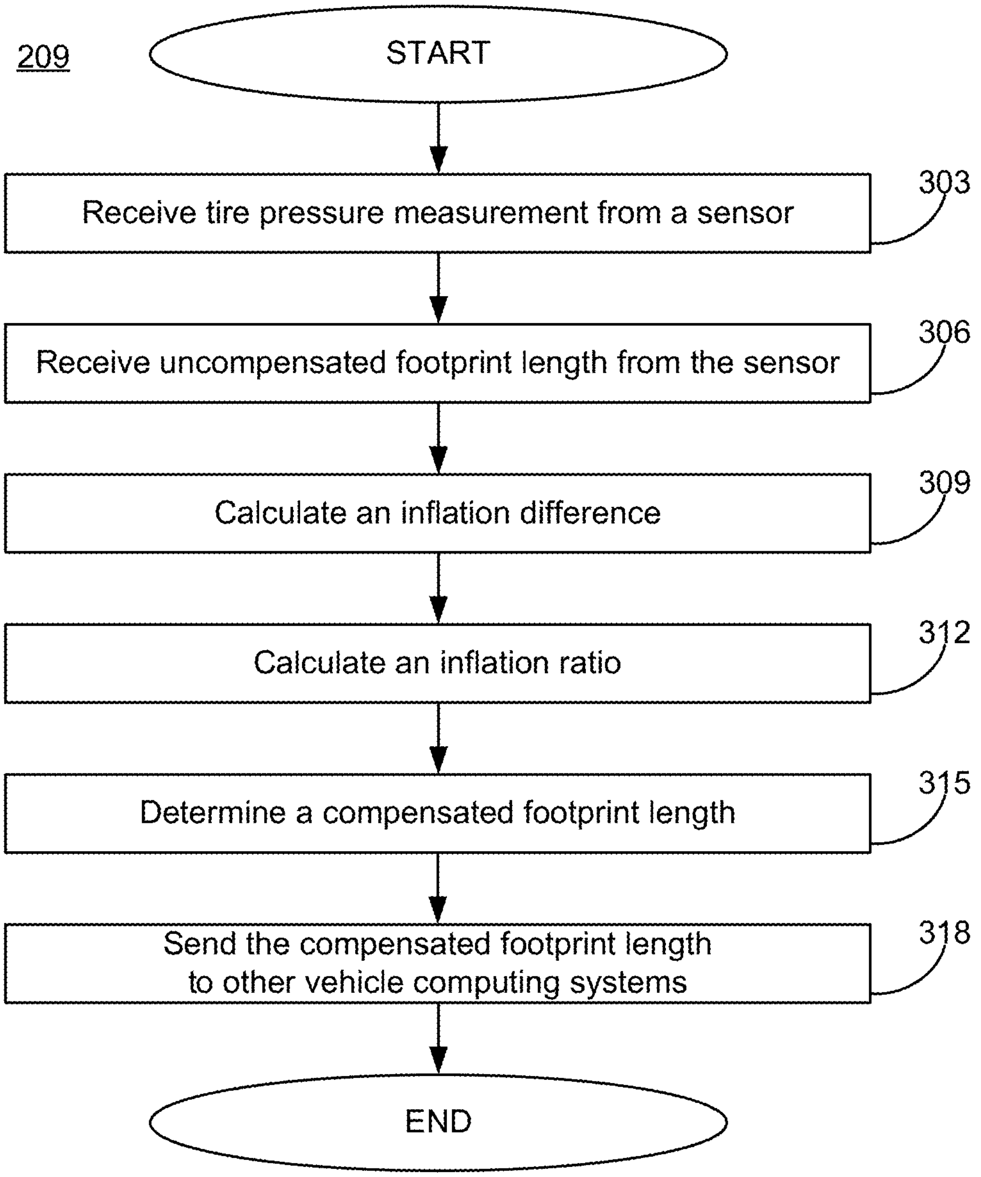
FIG. 3 is a flowchart illustrating one example of functionality implemented as portions of an application executed in a computing environment in the network environment of FIG. 2 according to various embodiments of the present disclosure.

Referring next to FIG. 3, shown is a flowchart that provides one example of the operation of a portion of the footprint length compensation application 209. The flowchart of FIG. 3 provides merely an example of the many different types of functional arrangements that can be employed to implement the operation of the depicted portion of the footprint length compensation application 209. As an alternative, the flowchart of FIG. 3 can be viewed as depicting an example of elements of a method implemented within the network environment 200.

Beginning with block 303, the footprint length compensation application 209 can receive a tire pressure measurement from a sensor 103. The sensor 109 can measure inflation pressure of a tire 100 in various unit types, such as pounds per square inch (PSI), pascals (Pa) or kilopascals (kPa), bars, atmospheres (ATM), and kilograms per square centimeter ($kg/cm^2$). The sensor 109 can send the inflation pressure to the footprint length compensation application 209, for which the footprint length compensation application 209 can receive the inflation pressure as a tire pressure measurement. The footprint length compensation application 209 can store the tire pressure measurement as a pressure measurement 218 in the data store 212.

Continuing to block 306, the footprint length compensation application 209 can receive an uncompensated footprint length from the sensor 103. The sensor 109 can measure footprint length of the tire 100 using metric units (e.g., millimeters, centimeters, etc.) or imperial units (e.g., inches, feet, etc.). The sensor 109 can send the footprint length of the tire 100 to the footprint length compensation application 209, for which the footprint length compensation application 209 can receive the footprint length of the tire as the uncompensated footprint length. The footprint length compensation application 209 can store the uncompensated footprint length as a footprint measurement 221 in the data store 212.

Continuing to block 309, the footprint length compensation application 209 can calculate an inflation difference. In at least one embodiment, the footprint length compensation application 209 can calculate the inflation difference by subtracting a target pressure 224 identified for the tire 100 from the tire pressure measurement received at block 303.

This can be represented as $\text{Inflation}_{difference}=\text{Inflation}_{measured}-\text{Inflation}_{target}$, where the "$\text{Inflation}_{measured}$" variable can be the tire pressure measurement received from the sensor 103 and the "$\text{Inflation}_{target}$" variable can be a tire pressure that is identified in the tire placard information 215, such as the target pressure 224. In at least some embodiments, the tire pressure measurement used in the previous formula can be an average tire pressure over of a period of time rather than the most recent tire pressure measurement. To calculate the average tire pressure measurement, the footprint length compensation application 209 can receive the pressure measurements 218 for a specified time period from the data store 212, sum their value, and divide by the total number of pressure measurements 218 in that time period.

Continuing to block 312, the footprint length compensation application 209 can calculate an inflation ratio. In at least one embodiment, the footprint length compensation application 209 can calculate an inflation ratio by dividing the inflation difference calculated at block 309 by the target pressure 224 identified for the tire 100. This can be represented as $$\text{Inflation}_{ratio} = \frac{\text{Inflation}_{difference}}{\text{Inflation}_{target}},$$

where the "$\text{Inflation}_{difference}$" is calculated in block 309 and the "$\text{Inflation}_{target}$" variable can be a tire pressure that is identified in the tire placard information 215, such as the target pressure 224.

Continuing to block 315, the footprint length compensation application 209 can determine a compensated footprint length. In some embodiments, the footprint length compensation application 209 can determine a compensated footprint length based at least in part on the inflation ratio calculated at block 312. For example, the compensated footprint length could be calculated based on the following formula: $\text{FPL}_{compensated}=\text{FPL}_{uncompensated}*(1+\text{SensorMod}*\text{Inflation}_{ratio})$, wherein the "$\text{FPL}_{uncompensated}$" variable can be the uncompensated footprint length received from the sensor 103 at block 306, the "SensorMod" variable can be a modifier or a sensor compensation value that compensates for the results received from the sensor 103, and the "$\text{Inflation}_{ratio}$" variable is the value calculated at block 312. In at least some embodiments, the value of the "SensorMod" variable can be "1", which means that the "SensorMod" variable has no effect on the "$\text{Inflation}_{ratio}$" variable. In at least some embodiments, the "SensorMod" variable can be another value that causes the results to normalize to expected values, which can be based at least on the calibration of the sensor 103.

Continuing to block 318, the footprint length compensation application 209 can send the compensated footprint length to other vehicle computing systems. In at least one embodiment, the footprint length compensation application 209 can send the compensated footprint length to a pressure regulator 227 to adjust the tire pressure and achieve the compensated footprint length. In at least some embodiments, the footprint length compensation application 209 can cause the tire to adjust the tire pressure to achieve the compensated footprint length by at least sending one or more instructions to a pressure regulator 227 of the tire 100 to modify the tire pressure. The instructions sent to the pressure regulator 227 can include instructions to increase or decrease the pressure, the compensated footprint length amount calculated at block 315, or various other data. As a result, the pressure regulator 227 can increase or decrease the pressure in the tire 100. The footprint length compensation application 209 can continue receiving updated footprint lengths from the sensor 103, as described in block 306. In some embodiments, the footprint length compensation application 209 can determine that a received updated footprint length matches the compensated footprint length calculated at block 315. In response, the footprint length compensation application 209 can send instructions to the pressure regulator 227 to cease modifying the pressure of the tire 100. In some embodiments, the pressure regulator 227 can determine when to cease modifying the pressure of the tire 100 without receiving instructions from the footprint length compensation application 209. In at least another embodiment, the footprint length compensation application 209 can send the compensated footprint length to a load calculation system. By sending the compensated footprint length to a load calculation system, such system can use the compensated footprint length in subsequent calculations, such as a load estimation algorithm. Once block 318 has completed, the flowchart of FIG. 3 can come to an end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart shows the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowchart can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Various embodiments of the present disclosure are described in the following clauses. Although the following clauses describe some embodiments of the present disclosure, other embodiments of the present disclosure are also set forth above.

Clause 1—A method, comprising receiving, from a sensor, a tire pressure measurement for a tire; receiving, from the sensor, an uncompensated footprint length for the tire; calculating an inflation difference between the tire pressure measurement and a target tire pressure for the tire; calculating an inflation ratio by at least on finding a quotient of the inflation difference over the target tire pressure for the tire; determining a compensated footprint length based at least in part on the inflation ratio; and sending the compensated footprint length to a vehicle computing system.

Clause 2—The method of clause 1, wherein determining the compensated footprint length based at least in part on the inflation ratio comprises calculating an inflation scale by summing inflation ratio and a fixed value; and calculating the compensated footprint length by taking product of the uncompensated footprint length with the inflation scale.

Clause 3—The method of clause 1 or clause 2, wherein the inflation ratio is further calculated by multiplying the quotient by a sensor compensation value.

Clause 4—The method of clause 3, further comprising determining the sensor compensation value based at least on a calibration of the sensor.

Clause 5—The method of any of clauses 1-4, wherein the tire pressure measurement is a first tire pressure measurement and causing the tire to adjust the tire pressure to achieve the compensated footprint length comprises sending, to a pressure regulator, an instruction to modify the tire pressure; receiving, from the sensor, an updated footprint length for the tire; and sending, to the pressure regulator based at least on a determination that the updated footprint length matches the compensated footprint length, an instruction to cease modifying the pressure.

Clause 6—The method of clause 5, wherein the instruction to modify the pressure is an instruction to increase the tire pressure by adding gasses to the tire.

Clause 7—The method of clause 5, wherein the instruction to modify the pressure is an instruction to decrease the tire pressure by releasing gasses from the tire.

Clause 8—The method of any of clauses 1-7, wherein the sensor calculates the tire pressure measurement by sampling the tire pressure periodically and determining an average tire pressure measurement for a tire pressure period.

Clause 9—The method of any of clauses 1-7, wherein the tire pressure measurement is an instantaneous measurement of the tire pressure at a specified point in time.

Clause 10—A system, comprising a computing device comprising a processor and a memory; and machine-readable instructions stored in the memory that, when executed by the processor, cause the computing device to at least receive, from a sensor, a tire pressure measurement for a tire; receive, from the sensor, an uncompensated footprint length for the tire; calculate an inflation difference between the tire pressure measurement and a target tire pressure for the tire; calculate an inflation ratio by at least on finding a quotient of the inflation difference over the target tire pressure for the tire; determine a compensated footprint length based at least in part on the inflation ratio; and cause the tire to adjust the tire pressure to achieve the compensated footprint length.

Clause 11—The system of clause 10, wherein the machine-readable instructions that determine the compensated footprint length based at least in part on the inflation ratio further cause the computing device to at least calculate an inflation scale by summing inflation ratio and a fixed value; and calculate the compensated footprint length by taking product of the uncompensated footprint length with the inflation scale.

Clause 12—The system of clause 10 or clause 11, wherein the inflation ratio is further calculated by multiplying the quotient by a sensor compensation value.

Clause 13—The system of clause 12, wherein the machine-readable instructions further cause the computing device to at least determine the sensor compensation value based at least on a calibration of the sensor.

Clause 14—The system of any of clauses 10-13, wherein the tire pressure measurement is a first tire pressure measurement and the machine-readable instructions that cause the tire to adjust the tire pressure to achieve the compensated footprint length further cause the computing device to at least send, to a pressure regulator, an instruction to modify the tire pressure; receive, from the sensor, an updated footprint length for the tire; and send, to the pressure regulator based at least on a determination that the updated footprint length matches the compensated footprint length, an instruction to cease modifying the pressure.

Clause 15—The system of clause 14, wherein the instruction to modify the pressure is an instruction to increase the tire pressure by adding gasses to the tire.

Clause 16—The system of clause 14, wherein the instruction to modify the pressure is an instruction to decrease the tire pressure by releasing gasses from the tire.

Clause 17—The system of any of clauses 10-16, wherein the sensor calculates the tire pressure measurement by sampling the tire pressure periodically and determining an average tire pressure measurement for a tire pressure period.

Clause 18—The system of any of clauses 10-16, wherein the tire pressure measurement is an instantaneous measurement of the tire pressure at a specified point in time.

Clause 19—A non-transitory, computer-readable medium, comprising machine-readable instructions that, when executed by a processor of a computing device, cause the computing device to at least receive, from a sensor, a tire pressure measurement for a tire; receive, from the sensor, an uncompensated footprint length for the tire; calculate an inflation difference between the tire pressure measurement and a target tire pressure for the tire; calculate an inflation ratio by at least on finding a quotient of the inflation difference over the target tire pressure for the tire; determine a compensated footprint length based at least in part on the inflation ratio; and cause the tire to adjust the tire pressure to achieve the compensated footprint length.

Clause 20—The non-transitory, computer-readable medium of clause 19, wherein the machine-readable instructions that determine the compensated footprint length based at least in part on the inflation ratio further cause the computing device to at least calculate an inflation scale by summing inflation ratio and a fixed value; and calculate the compensated footprint length by taking product of the uncompensated footprint length with the inflation scale.

Clause 21—The non-transitory, computer-readable medium of clause 19 or clause 20, wherein the inflation ratio is further calculated by multiplying the quotient by a sensor compensation value.

Clause 22—The non-transitory, computer-readable medium of clause 21, wherein the machine-readable instructions further cause the computing device to at least determine the sensor compensation value based at least on a calibration of the sensor.

Clause 23—The non-transitory, computer-readable medium of any of clauses 19-22, wherein the tire pressure measurement is a first tire pressure measurement and the machine-readable instructions that cause the tire to adjust the tire pressure to achieve the compensated footprint length further cause the computing device to at least send, to a pressure regulator, an instruction to modify the tire pressure; receive, from the sensor, an updated footprint length for the tire; and send, to the pressure regulator based at least on a determination that the updated footprint length matches the compensated footprint length, an instruction to cease modifying the pressure.

Clause 24—The non-transitory, computer-readable medium of clause 23, wherein the instruction to modify the pressure is an instruction to increase the tire pressure by adding gasses to the tire.

Clause 25—The non-transitory, computer-readable medium of clause 23, wherein the instruction to modify the pressure is an instruction to decrease the tire pressure by releasing gasses from the tire.

Clause 26—The non-transitory, computer-readable medium of any of clauses 19-25, wherein the sensor calculates the tire pressure measurement by sampling the tire pressure periodically and determining an average tire pressure measurement for a tire pressure period.

Clause 27—The non-transitory, computer-readable medium of any of clauses 19-25, wherein the tire pressure measurement is an instantaneous measurement of the tire pressure at a specified point in time.

Clause 28—The method of any of clauses 1-9, wherein the vehicle computation system is configured to calculate the load of a vehicle.

Clause 29—The system of any of clauses 10-18, wherein the machine-readable instructions further cause the computing device to at least send the compensated footprint length to a vehicle computing system.

Clause 30—The system of clause 29, wherein the vehicle computation system is configured to calculate the load of a vehicle.

Clause 31—The non-transitory, computer-readable medium of any of clauses 19-27, wherein the machine-readable instructions further cause the computing device to at least send the compensated footprint length to a vehicle computing system.

Clause 32—The non-transitory, computer-readable medium of clause 31, wherein the vehicle computation system is configured to calculate the load of a vehicle.

Clause 33—The method of any of clauses 1-4, wherein sending the compensated footprint length to the vehicle computing system causes a pressure regulator to adjust the tire pressure of the tire to achieve the compensated footprint length by at least sending, to the vehicle computing system, an instruction to modify the tire pressure; receiving, from the sensor, an updated footprint length for the tire; and sending, to the vehicle computing system and based at least on a determination that the updated footprint length matches the compensated footprint length, an instruction to cease modifying the pressure.

Clause 34—The method of clause 33, wherein the instruction to modify the pressure is an instruction to increase the tire pressure by adding gasses to the tire.

Clause 35—The method of clause 33, wherein the instruction to modify the pressure is an instruction to decrease the tire pressure by releasing gasses from the tire.

Clause 36—The system of any of clauses 10-13, wherein the machine-readable instructions further cause the computing device to at least send the compensated footprint length to a vehicle computing system, which causes a pressure regulator to adjust the tire pressure of the tire to achieve the compensated footprint length by at least sending, to the vehicle computing system, an instruction to modify the tire pressure; receiving, from the sensor, an updated footprint length for the tire; and sending, to the vehicle computing system and based at least on a determination that the updated footprint length matches the compensated footprint length, an instruction to cease modifying the pressure.

Clause 37—The system of clause 36, wherein the instruction to modify the pressure is an instruction to increase the tire pressure by adding gasses to the tire.

Clause 38—The system of clause 36, wherein the instruction to modify the pressure is an instruction to decrease the tire pressure by releasing gasses from the tire.

Clause 39—The non-transitory, computer-readable medium of any of clauses 19-22, wherein the machine-readable instructions further cause the computing device to at least send the compensated footprint length to a vehicle computing system, which causes a pressure regulator to adjust the tire pressure of the tire to achieve the compensated footprint length by at least sending, to the vehicle computing system, an instruction to modify the tire pressure; receiving, from the sensor, an updated footprint length for the tire; and sending, to the vehicle computing system and based at least on a determination that the updated footprint length matches the compensated footprint length, an instruction to cease modifying the pressure.

Clause 40—The non-transitory, computer-readable medium of clause 39, wherein the instruction to modify the pressure is an instruction to increase the tire pressure by adding gasses to the tire.

Clause 41—The non-transitory, computer-readable medium of clause 39, wherein the instruction to modify the pressure is an instruction to decrease the tire pressure by releasing gasses from the tire.

Therefore, the following is claimed:

1. A method, comprising:

receiving, from a sensor, a tire pressure measurement for a tire;

receiving, from the sensor, an uncompensated footprint length for the tire;

calculating an inflation difference between the tire pressure measurement and a target tire pressure for the tire;

calculating an inflation ratio by at least on finding a quotient of the inflation difference over the target tire pressure for the tire;

determining a compensated footprint length based at least in part on the inflation ratio; and sending the compensated footprint length to a vehicle computing system, wherein sending the compensated footprint length to the vehicle computing system causes a pressure regulator to adjust the tire pressure of the tire to achieve the compensated footprint length by at least:

sending, to the vehicle computing system, an instruction to modify the tire pressure, wherein the instruction to modify the pressure includes an instruction to increase the tire pressure by adding gasses to the tire or to decrease the tire pressure by releasing gasses from the tire;

receiving, from the sensor, an updated footprint length for the tire; and sending, to the vehicle computing system and based at least on a determination that the updated footprint length matches the compensated footprint length, an instruction to cease modifying the pressure.

2. The method of claim 1, wherein determining the compensated footprint length based at least in part on the inflation ratio comprises:

calculating an inflation scale by summing inflation ratio and a fixed value; and calculating the compensated footprint length by taking product of the uncompensated footprint length with the inflation scale.

3. The method of claim 1, wherein the inflation ratio is further calculated by multiplying the quotient by a sensor compensation value.

4. The method of claim 3, further comprising determining the sensor compensation value based at least on a calibration of the sensor.

5. The method of claim 1, wherein the sensor calculates the tire pressure measurement by sampling the tire pressure periodically and determining an average tire pressure measurement for a tire pressure period.

6. The method of claim 1, wherein the tire pressure measurement is an instantaneous measurement of the tire pressure at a specified point in time.

7. A system, comprising:

a computing device comprising a processor and a memory; and machine-readable instructions stored in the memory that, when executed by the processor, cause the computing device to at least:

receive, from a sensor, a tire pressure measurement for a tire;

receive, from the sensor, an uncompensated footprint length for the tire;

calculate an inflation difference between the tire pressure measurement and a target tire pressure for the tire;

calculate an inflation ratio by at least on finding a quotient of the inflation difference over the target tire pressure for the tire;

determine a compensated footprint length based at least in part on the inflation ratio; and send the compensated footprint length to a vehicle computing system, which causes a pressure regulator to adjust the tire pressure of the tire to achieve the compensated footprint length by at least:

sending, to the vehicle computing system, an instruction to modify the tire pressure, wherein the instruction to modify the pressure is an instruction to increase the tire pressure by adding gasses to the tire or to decrease the tire pressure by releasing gasses from the tire;

receiving, from the sensor, an updated footprint length for the tire; and sending, to the vehicle computing system and based at least on a determination that the updated footprint length matches the compensated footprint length, an instruction to cease modifying the pressure.

8. The system of claim 7, wherein the machine-readable instructions that determine the compensated footprint length based at least in part on the inflation ratio further cause the computing device to at least:

calculate an inflation scale by summing inflation ratio and a fixed value; and calculate the compensated footprint length by taking product of the uncompensated footprint length with the inflation scale.

9. The system of claim 7, wherein the inflation ratio is further calculated by multiplying the quotient by a sensor compensation value.

10. The system of claim 9, wherein the machine-readable instructions further cause the computing device to at least determine the sensor compensation value based at least on a calibration of the sensor.

11. The system of claim 7, wherein the sensor calculates the tire pressure measurement by sampling the tire pressure periodically and determining an average tire pressure measurement for a tire pressure period.

12. A non-transitory, computer-readable medium, comprising machine-readable instructions that, when executed by a processor of a computing device, cause the computing device to at least:

receive, from a sensor, a tire pressure measurement for a tire;

receive, from the sensor, an uncompensated footprint length for the tire;

calculate an inflation difference between the tire pressure measurement and a target tire pressure for the tire;

calculate an inflation ratio by at least on finding a quotient of the inflation difference over the target tire pressure for the tire;

determine a compensated footprint length based at least in part on the inflation ratio; and cause the tire to adjust the tire pressure to achieve the compensated footprint length.

13. The non-transitory, computer-readable medium of claim 12, wherein the machine-readable instructions that determine the compensated footprint length based at least in part on the inflation ratio further cause the computing device to at least:

calculate an inflation scale by summing inflation ratio and a fixed value; and calculate the compensated footprint length by taking product of the uncompensated footprint length with the inflation scale.

14. The non-transitory, computer-readable medium of claims 12, wherein the tire pressure measurement is a first tire pressure measurement and the machine-readable instructions that cause the tire to adjust the tire pressure to achieve the compensated footprint length further cause the computing device to at least:

send, to a pressure regulator, an instruction to modify the tire pressure;

receive, from the sensor, an updated footprint length for the tire; and send, to the pressure regulator based at least on a determination that the updated footprint length matches the compensated footprint length, an instruction to cease modifying the pressure.

15. The non-transitory, computer-readable medium of claims 12, wherein the sensor calculates the tire pressure measurement by sampling the tire pressure periodically and determining an average tire pressure measurement for a tire pressure period.

* * * * *